(12) United States Patent
Baehrle-Miller et al.

(10) Patent No.: US 10,207,693 B2
(45) Date of Patent: Feb. 19, 2019

(54) BRAKE SYSTEM CONTROL UNIT FOR A VEHICLE

(71) Applicant: Robert Bosch GmbH, Stuttgart (DE)

(72) Inventors: Frank Baehrle-Miller, Schoenaich (DE); Peter Rebholz-Goldmann, Neuenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/635,758

(22) Filed: Jun. 28, 2017

(65) Prior Publication Data

US 2018/0079398 A1 Mar. 22, 2018

(30) Foreign Application Priority Data

Sep. 22, 2016 (DE) .................. 10 2016 218 209

(51) Int. Cl.
  *B60T 13/74* (2006.01)
  *B60T 13/66* (2006.01)
  *B60T 7/04* (2006.01)
  *B60T 7/12* (2006.01)
  *B60T 13/58* (2006.01)

(52) U.S. Cl.
  CPC ............ *B60T 13/66* (2013.01); *B60T 7/042* (2013.01); *B60T 7/12* (2013.01); *B60T 13/588* (2013.01); *B60T 13/741* (2013.01); *B60T 13/746* (2013.01); *B60T 2270/402* (2013.01); *B60T 2270/416* (2013.01)

(58) Field of Classification Search
  CPC ...... B60T 13/66; B60T 13/662; B60T 13/746; B60T 7/12; B60T 7/042; B60T 8/171

USPC ................. 303/3, 20, 114.1; 701/70, 71; 188/156–164

See application file for complete search history.

(56) References Cited

U.S. PATENT DOCUMENTS

| 6,158,822 | A | * | 12/2000 | Shirai | ............... B60T 13/74 188/1.11 L |
|---|---|---|---|---|---|
| 2012/0074770 | A1 | * | 3/2012 | Lee | ............. B60T 8/172 303/20 |
| 2013/0314222 | A1 | * | 11/2013 | Park | ............. B60Q 1/00 340/453 |
| 2014/0139333 | A1 | * | 5/2014 | Burgdorf | ........... B60Q 1/441 340/479 |
| 2015/0217741 | A1 | * | 8/2015 | Kikawa | ............ B60L 7/18 701/71 |

(Continued)

FOREIGN PATENT DOCUMENTS

DE 10 2014 204 287 A1 9/2015

*Primary Examiner* — Christopher P Schwartz
(74) *Attorney, Agent, or Firm* — Maginot Moore & Beck LLP

(57) ABSTRACT

The brake system control unit for a vehicle having a hydraulic vehicle brake and an electromechanical brake device including at least one electric brake motor includes a microcontroller configured to actuate at least one active brake component of the vehicle. The control unit further includes a system ASIC configured to acquire sensor signals in the vehicle. The control unit further includes a brake motor ASIC configured to actuate an electric brake motor of an electromechanical brake device and acquire pedal travel transducer signals of the brake pedal of the vehicle. The control unit includes a plurality of communication interfaces to connect the microcontroller to the system ASIC and to the brake motor ASIC.

12 Claims, 3 Drawing Sheets

(56) References Cited

U.S. PATENT DOCUMENTS

| | | | |
|---|---|---|---|
| 2015/0251639 A1* | 9/2015 | Sautter | B60T 13/741 |
| | | | 701/70 |
| 2017/0021816 A1* | 1/2017 | Dobberphul | B60T 13/745 |
| 2017/0361824 A1* | 12/2017 | Rizzo | B60T 7/22 |
| 2018/0001875 A1* | 1/2018 | Houtman | B60T 7/042 |
| 2018/0037207 A1* | 2/2018 | Pennala | B60T 7/042 |
| 2018/0043865 A1* | 2/2018 | Pennala | B60T 7/06 |
| 2018/0043866 A1* | 2/2018 | Monsere | B60T 7/042 |
| 2018/0079399 A1* | 3/2018 | Baehrle-Miller | B60T 7/042 |

\* cited by examiner

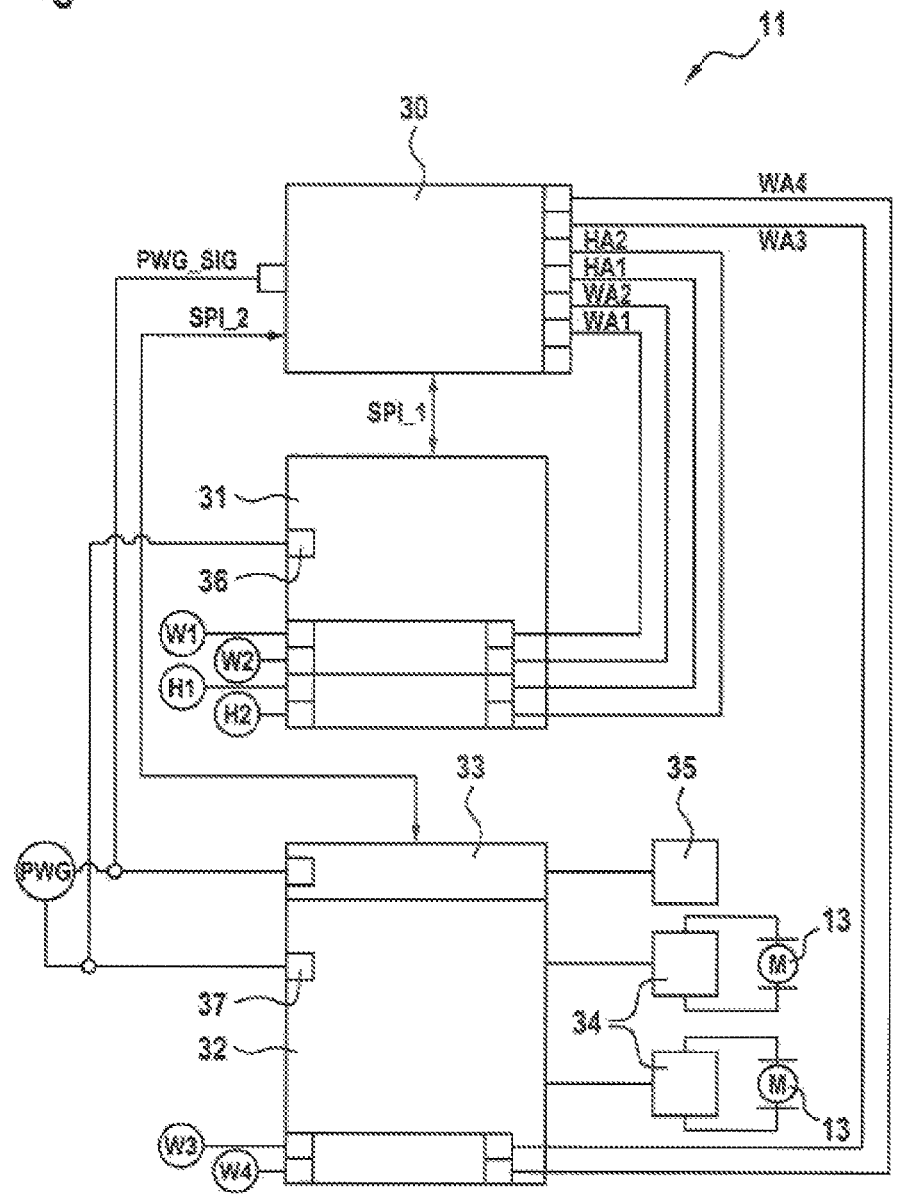

BRAKE SYSTEM CONTROL UNIT FOR A VEHICLE

This application claims priority under 35 U.S.C. § 119 to patent application no. DE 102016218209.9 filed on Sep. 22, 2016 in Germany, the disclosure of which is incorporated herein by reference in its entirety.

The disclosure relates to a brake system control unit for a vehicle having a hydraulic vehicle brake and having an electromechanical brake device which comprises at least one electric brake motor.

BACKGROUND

DE 10 2014 204 287 A1 describes a brake system control unit for a vehicle which is equipped with a hydraulic vehicle brake and with an electromechanical parking brake with two electric brake motors at the wheels of the rear axle. By means of the control unit, the brake system can be actuated such that, in a normal operating mode, the electric brake motors can be automatically actuated for example for performing a parking process. By contrast, in a safety operating mode, an activation of the electric brake motors is prevented. The safety operating mode is implemented during normal driving operation in order to prevent the parking brake being inadvertently activated during travel.

SUMMARY

The brake system control unit according to the disclosure can be used in vehicles having a brake system which comprises a hydraulic vehicle brake and an electromechanical brake device with at least one electric brake motor, for example 2 electric brake motors. The control unit comprises a microcontroller by means of which at least one, preferably multiple, active brake components, for example an electrically controllable actuator for manipulating the hydraulic pressure in the hydraulic vehicle brake, can be actuated. Furthermore, the control unit comprises a system ASIC (Application-Specific Integrated Circuit) for acquiring sensor signals of the vehicle, which can be fed to the microcontroller. Furthermore, the control unit comprises a brake motor ASIC, which is formed separately from the system ASIC, for actuating the at least one electric brake motor of the electromechanical brake device. Pedal travel transducer signals of the brake pedal are acquired in the brake motor ASIC, and these can be fed as pedal travel information to the microcontroller. The microcontroller is connected both to the system ASIC and to the brake motor ASIC via communication interfaces.

Thus, pedal travel information relating to the brake pedal is available in the brake motor ASIC and can be shared with the microcontroller via the communication interface. The information relating to the present brake pedal position is thus available to the microcontroller via the brake motor ASIC. The pedal travel information of the brake pedal is fed to the brake motor ASIC from a pedal travel sensor at the brake pedal via a further interface.

This embodiment has the advantage that, even in the event of a failure of the microcontroller, of the system ASIC or of a communication interface between the microcontroller and the system ASIC or between the microcontroller and the brake motor ASIC, the electromechanical brake device with the at least one electric brake motor can be actuated. The failure of a component of the control unit does not influence the brake motor ASIC, which is capable, independently of the microcontroller, of actuating the at least one electric brake motor. The actuation is performed in particular in a manner dependent on the present brake pedal position, which reflects the braking torque demand from the driver. Since the brake pedal position is available as a pedal travel transducer signal in the brake motor ASIC, the latter is capable of actuating the brake motor in accordance with the brake pedal position.

The control unit configured in this manner furthermore makes it possible for the failure of an active component in the hydraulic vehicle brake, by means of which the hydraulic brake pressure can be manipulated, to be entirely or partially compensated. For example, if a hydraulic pump or some other electrically controllable actuator for manipulating the brake pressure fails, then it is possible, by means of an activation of the electromechanical brake device in a manner controlled on the basis of the brake pedal travel, for the contribution of the field hydraulic pump or of the actuator to be at least partially compensated by means of the electric brake motor, even if a component of the control unit such as the microcontroller, system ASIC or a communication interface between the microcontroller and the system ASIC or between the microcontroller and the brake motor ASIC fails.

In the normal situation, in the case of a functional control unit without failure of a component, the normal braking process is preferably realized exclusively by means of the hydraulic vehicle brake for the purposes of braking the vehicle. The electromechanical brake device is advantageously used only as a parking brake in order to generate a braking force which immobilizes the vehicle at a standstill. If necessary, it is however also possible in the normal situation for the electromechanical brake device to be activated in order to generate an electromechanical braking force in addition to the hydraulic braking force, so as to assist the hydraulic vehicle brake. In the normal situation, the activation of the electric brake motor is performed by means of a corresponding activation signal of the microcontroller, which is transmitted to the brake motor ASIC via the communication interface.

The electromechanical brake device is preferably integrated into one or more wheel brake devices of the hydraulic vehicle brake. In this embodiment, the brake piston in the wheel brake device can be adjusted in the direction of the brake disc both by hydraulic brake fluid of the hydraulic vehicle brake and simultaneously, or independently thereof, by the electric brake motor. In an advantageous embodiment, the electromechanical brake device comprises in each case one electric brake motor at the two wheel brake devices at the rear axle of the vehicle.

In one advantageous embodiment, the voltage supply to the pedal travel sensor by means of which the present brake pedal position is determined is realized via the brake motor ASIC and via at least one further component of the control unit. Said further component of the control unit is for example the system ASIC. It is thus possible for the voltage supply to the pedal travel sensor at the brake pedal to be realized both via the system ASIC and by the brake motor ASIC. The voltage supply continues to be ensured if one of said components, in particular the system ASIC, fails, such that the functionality of the pedal travel sensor is not impaired by the failure of one voltage supply.

In a further advantageous embodiment, wheel rotational speed signals are acquired and processed in the system ASIC, which signals are made available to the microcontroller via the communication interface as speed information. Wheel rotational speed signals are also acquired and processed in the brake motor ASIC. This embodiment makes it possible, in the event of a failure of the microcontroller, of the system ASIC and/or of a communication interface between microcontroller and system ASIC or between microcontroller and brake motor ASIC, for the electric brake motor of the electromechanical brake device to be actuated by means of the brake motor ASIC automatically or in response to a demand from the driver, and for a braking force to be generated by electromechanical means. The braking force may be generated both during a normal braking process and for the parking of the vehicle.

In a further advantageous embodiment, the wheel rotational speed signals in the system ASIC and the wheel rotational speed signals in the brake motor ASIC relate to different vehicle wheels. It is advantageous for the wheel rotational speed signals of in each case two wheel rotational speed sensors to be processed in each ASIC. For example, the wheel rotational speed signals from sensors at the front wheels may be processed in the system ASIC, and the wheel rotational speed signals from sensors at the rear wheels may be processed in the brake motor ASIC. By distributing the wheel rotational speed signals between both ASICs, it is ensured that, even in the event of a failure of the microcontroller, for example, the brake motor can be actuated automatically in speed-dependent fashion by means of the brake motor ASIC.

In a further advantageous embodiment, the brake motor ASIC comprises at least one electronic H-bridge for the actuation of the electric brake motor. In a preferred embodiment, the brake motor ASIC has a number of electronic H-bridges corresponding to the number of electric brake modules. Thus, by means of in each case one H-bridge, one electric brake motor can be actuated by means of the brake motor ASIC. The respective electric brake motor can be actuated in both directions by means of the H bridge, such that both a brake-application movement of the brake motor for generating electromechanical braking force and a brake-release movement of the brake motor for the dissipation of the electromechanical braking force can be performed by means of the brake motor ASIC. The H bridge can also be switched into a neutral position in which the associated brake motor is deactivated.

In a further expedient embodiment, the brake motor ASIC has a logic unit for acquiring the switching state of an actuation switch by means of which the electromechanical brake device can be manually activated or deactivated by the driver. The present switch state can be acquired by means of the logic unit. Furthermore, the communication interface for communication with the microcontroller advantageously also runs via the logic unit, or the logic unit forms a constituent part of the communication interface to the microcontroller.

In a further advantageous embodiment, not only the speed signals but also motor rotational position signals of the electric brake motor are processed in the system ASIC. The motor rotational position signals originate from a motor rotational position sensor, for example a Hall sensor, for determining the present rotational position of the rotor shaft of the electric brake motor. In the case of multiple electric brake motors, a corresponding plurality of motor rotational position signals are fed to the system ASIC. The motor rotational position signals can, in the microcontroller, be used for variable actuation of the electric brake motors, for example by means of PWM actuation. In an alternative embodiment, motor rotational position signals are dispensed with; in this case, the actuation is advantageously realized in continuous or quasi-continuous fashion.

The logic unit in the brake motor ASIC may be configured such that, in the event of a failure of the microcontroller or in the event of a partial failure of the wheel-rotational speed signals, the vehicle is decelerated, and/or a parking brake force is generated in the vehicle, by means of an actuation of the electric brake motor. Here, a braking strategy adapted to the respective deceleration demand can be realized on the basis of the measured motor current in the electric brake motor. For example, for the parking brake function and the permanent provision of a parking brake force which immobilizes the vehicle, it may be provided that, following the activation peak of the motor current and the subsequent idle current, the increase in motor current associated with the force build-up can be determined and, in order to realize a stepped increase in electromechanical braking force, the electric brake motor can be temporarily deactivated, wherein the braking force is maintained owing to the self-locking action. The brake motor is thereupon activated again until the next force step is reached. This approach is repeated until the parking brake force required for immobilizing the vehicle at a standstill is reached in steps. If appropriate, PWM actuation may be implemented, in which the current increase responsible for the magnitude of the steps in the brake force profile is set.

It is furthermore also possible for a slip-dependent deceleration to be set by means of corresponding actuation of the electric brake motor. Here, different wheel speeds are compared with one another. If a maximum degree of slip is exceeded, the electric brake motor is opened again until a lower slip threshold is reached. By contrast, if the slip is too low, the electric brake motor is actuated in the brake-application direction in order to increase the brake force.

In the method for operating the brake system control unit, during normal operation with a functional microcontroller, the actuation of preferably all active brake components is performed by means of the microcontroller through corresponding generation of control signals. For example, if a parking braking force is to be generated by means of the electric brake motor, the microcontroller generates control signals which are fed via the communication interface to the brake motor ASIC, in which the electric brake motor is correspondingly actuated.

By contrast, in the event of a failure of the microcontroller or of a further component of the control unit, with the exception of the brake motor ASIC, the electric brake motor is automatically actuated, in the brake motor ASIC, in order to generate a braking force. This is performed in particular in a manner dependent on the present brake pedal position, for which purpose the pedal travel transducer signals available in the brake motor ASIC are processed.

BRIEF DESCRIPTION OF THE DRAWINGS

Further advantages and expedient embodiments emerge from the further claims, from the figure description and from the drawings, in which:

FIG. 3 shows a functional diagram of a control unit of the brake system with hydraulic vehicle brake and electromechanical brake device.

DETAILED DESCRIPTION

In the figures, identical components are denoted by the same reference designations.

Figure 1:
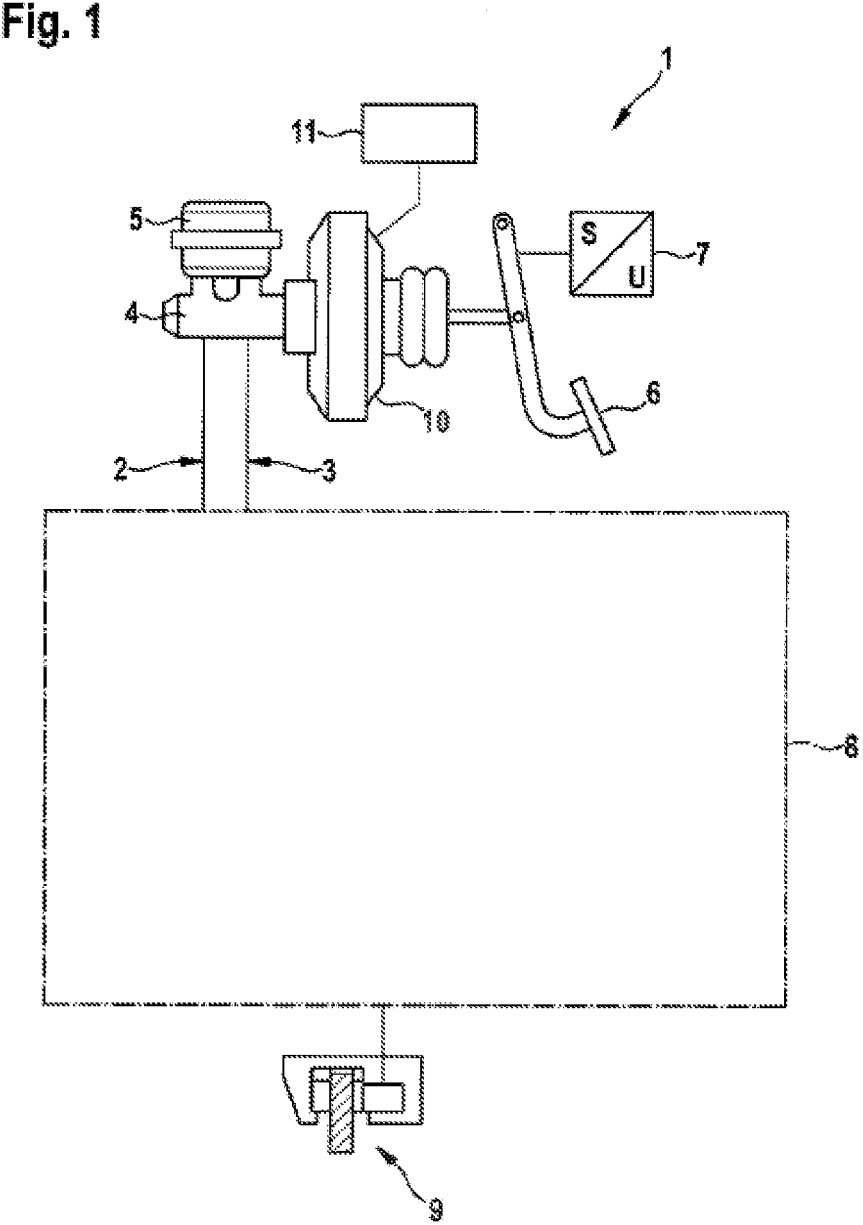
FIG. 1 is a schematic illustration of a hydraulic vehicle brake booster, wherein the wheel brake devices of the vehicle brake at the vehicle rear axle are additionally equipped with an electromechanical brake device with an electric brake motor.

The hydraulic vehicle brake 1 illustrated in FIG. 1 for a vehicle comprises a front axle brake circuit 2 and a rear-axle brake circuit 3 for supplying a brake fluid at hydraulic pressure, and actuating, wheel brake devices 9 at each wheel of the vehicle. The brake circuits may also be configured as two diagonal brake circuits with in each case one front wheel and one rear wheel arranged diagonally with respect thereto.

The two brake circuits 2, 3 are connected to a common master brake cylinder 4 which is supplied with brake fluid by means of a brake fluid reservoir 5. The master brake cylinder piston within the master brake cylinder 4 is actuated by the driver via the brake pedal 6, and the pedal travel imparted by the driver is measured by means of a pedal travel sensor 7. Between the brake pedal 6 and the master brake cylinder 4 there is situated a brake booster 10 which comprises, for example, an electric motor, which preferably actuates the master brake cylinder 4 via a gearing (iBooster). The brake booster 10 constitutes an active brake component for influencing the hydraulic brake pressure.

The actuation movement of the brake pedal 6 as measured by the pedal travel sensor 7 is transmitted as a sensor signal to a control unit 11 of the brake system, in which control signals for the actuation of the brake booster 10 are generated. The supply of brake fluid to the wheel brake devices 9 is performed in each brake circuit 2, 3 via various switching valves which, together with further assemblies, are part of a hydraulic brake system 8. The hydraulic brake system 8 furthermore includes a hydraulic pump, which is a constituent part of an electronic stability program (ESP). The hydraulic pump is also an active brake component for manipulating the hydraulic brake pressure.

Figure 2:
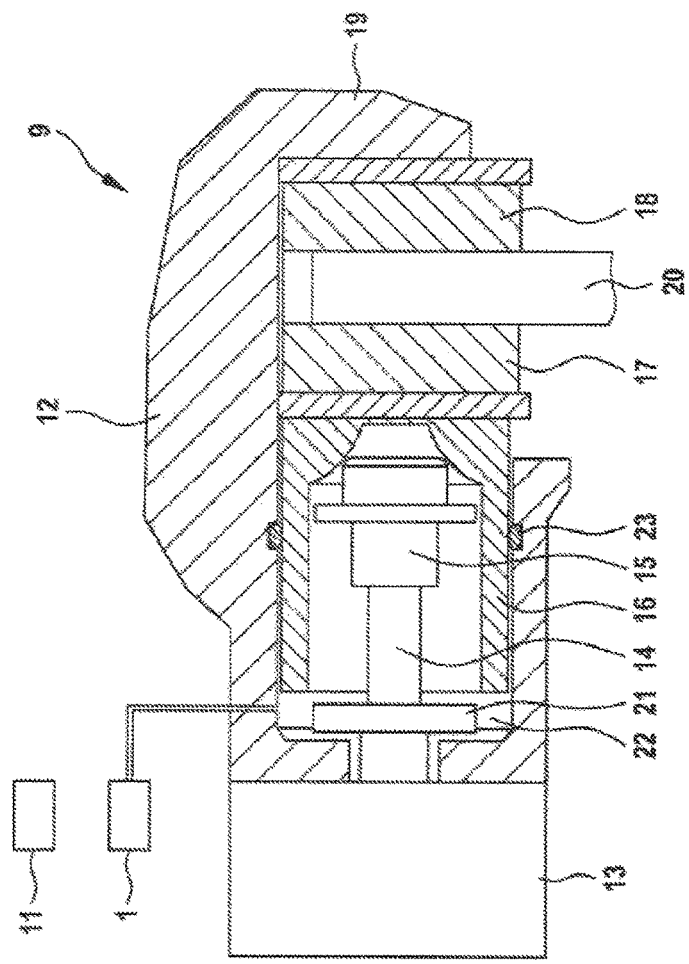
FIG. 2 shows a section through an electromechanical brake device with an electric brake motor.

FIG. 2 illustrates in detail the wheel brake device 9, which is arranged at a wheel at the rear axle of the vehicle. The wheel brake device 9 is part of the hydraulic vehicle brake 1 and is supplied with brake fluid 22 from the rear-axle brake circuit. The wheel brake device 9 furthermore has an electromechanical brake device, which is preferably used as a parking brake for immobilizing a vehicle at a standstill, but which can also be used for braking the vehicle when the vehicle is in motion, in particular at low vehicle speeds below a speed threshold.

The electromechanical brake device comprises a brake caliper 12 with a caliper section 19 which engages over a brake disc 20. As an actuator, the brake device has a motor-gearing unit with a direct-current electric motor as brake motor 13, the rotor shaft of which drives a spindle 14 in rotation, on which spindle a spindle nut 15 is arranged in rotationally fixed fashion. When the spindle 14 rotates, the spindle nut 15 is adjusted axially. The spindle nut 15 moves within a brake piston 16, which bears a brake pad 17 which is pressed by the brake piston 16 against the brake disk 20. On the opposite side of the brake disk 20, there is situated a further brake pad 18 which is held in positionally fixed fashion on the caliper section 19. The brake piston 16 is, on its outer side, sealed off in pressure-tight fashion with respect to the accommodating housing by means of an encircling sealing ring 23.

Within the brake piston 16, the spindle nut 15 can, in the event of a rotational movement of the spindle 14, move axially forward in the direction of the brake disk 20 or, in the event of an oppositely directed rotational movement of the spindle 14, move axially rearward as far as an end stop 21. To generate a clamping force, the spindle nut 15 acts on the inner face side of the brake piston 16, whereby the brake piston 16, which is mounted in axially displaceable fashion in the brake device, is pressed with the brake pad 17 against the facing face surface of the brake disk 20. The spindle nut 15 constitutes a transmission element between the brake motor and the brake piston.

For the hydraulic braking force, the brake piston 16 is acted on by the hydraulic pressure of the brake fluid 22 from the hydraulic vehicle brake 1. The hydraulic pressure may also act in an assisting manner during the actuation of the electromechanical braking device when the vehicle is at a standstill, such that the total braking force is made up of the electric motor contribution and the hydraulic contribution. When the vehicle is in motion, either only the hydraulic vehicle brake is active, or both the hydraulic vehicle brake and the electromechanical brake device are active, or only the electromechanical brake device is active, in order to generate the braking force. The control signals for the actuation both of the adjustable components of the hydraulic vehicle brake 1 and of the electromechanical wheel brake device 9 are generated in the control unit 11.

FIG. 3 illustrates a functional diagram of the control unit 11, which comprises a microcontroller 30, a system ASIC 31 and a brake motor ASIC 32. The microcontroller is connected to the system ASIC 31 via a communication interface SPI_1 and to the brake motor ASIC 32 via a further communication interface SPI_2.

In the system ASIC 31, wheel rotational speed signals W1 and W2 which originate from wheel rotational speed sensors at two wheels of the vehicle are received and processed.

Likewise, in the system ASIC 31, motor rotational position signals H1 and H2 from Hall sensors at the two electric brake motors of the electromechanical brake device are received and processed. The processed wheel rotational speed signals WA1 and WA2 and the processed motor rotational position signals HA1 and HA2 are made available to the microcontroller 30.

The brake motor ASIC 32 comprises a logic unit 33 which communicates with the microcontroller 30 via the communication interface SPI_2. In the brake motor ASIC 32, further wheel rotational speed signals W3 and W4 are received, which originate from further wheel rotational speed sensors at further vehicle wheels. For example, the wheel rotational speed signals W1 and W2 in the system ASIC 31 relate to the front wheels, and the wheel rotational speed signals W3 and W4 in the brake motor ASIC relate to the rear wheels of the vehicle. The processed wheel rotational speed signals WA3 and WA4 are made available to the microcontroller 30 by the brake motor ASIC 32.

The brake motor ASIC 32 also includes, as electronic circuits, two H-bridges 34 which are assigned to in each case one electric brake motor 13 of the electromechanical brake device. The H-bridges 34 are actuated by means of the brake motor ASIC 32 and regulate the functions of the electric brake motors 13 which, depending on actuation, are caused to perform a break-application movement in order to generate a braking force, or are caused to perform an opening movement, or deactivated, in order to dissipate a braking force.

The switching state of an actuation switch 35, by means of which the electromechanical brake device is manually activated or deactivated by the driver and, in the event of activation, the actuation direction of the electric brake motors is controlled, can be acquired by means of the logic unit 33 of the brake motor ASIC 32. In the normal situation, with a fully functional microcontroller 30, it is the case that, to realize the parking brake for immobilizing the vehicle at a standstill, the parking brake is actuated manually by the driver using the actuation switch 35, whereupon, in the brake motor ASIC 32, actuation signals for the actuation of the electric brake motors 30 are generated by means of the H-bridges 34, and the electric brake motors 30 are caused to perform a break-application movement in order to generate electromechanical braking force. Here, the position of the actuation switch 35 is acquired by means of the logic unit 33, and the result is made available to the microcontroller 30. In the microcontroller 30, the evaluation of the driver demand and the execution of the program for the actuation of the brake motors 13 are performed, wherein the result of the program for the actuation of the brake motors 13 is made available to the brake motor ASIC 32, and the latter then actuates brake motors 13 in accordance with the information provided via the communication interface SPI_2. During the actuation, the measurement variables acquired in the brake motor ASIC 30, in particular current and voltage of the brake motors 13, are made available to the microcontroller 30 via the communication interface SPI_2. Thus, the program for the control of the brake motors has information regarding the state of the brake motors 13 at all times, and can automatically interrupt the actuation again when a setpoint braking force has been reached or a release travel has been reached.

In the event of a failure of the microcontroller 30, the functionality of the brake motor ASIC 32 is maintained, because the actuation of the electric brake motors 13 by means of the H-bridges 34 is performed exclusively by means of the brake motor ASIC 32. It is thus possible for the parking brake to be activated manually or automatically even in the event of a failure of the microcontroller 30.

To avoid excessively low clamping forces, it may be expedient, in the brake-application process, to select a deactivation current which leads to an adequate clamping force even under adverse voltage conditions and brake motor temperatures.

It is furthermore possible, in the event of a failure of the microcontroller 30, for the electromechanical brake device with the brake motors 13 to be used for generating a braking force when the vehicle is in motion, for example in order to compensate the failure of a hydraulic actuator. In this case, the actuation of the electric brake motors is performed in speed-dependent fashion, for which purpose the speed information from the wheel rotational speed signals W3 and W4 is taken into consideration in the brake motor ASIC 32.

The logic unit 33 in the brake motor ASIC 32 receives pedal travel transducer signals PWG_SIG from a pedal travel sensor PWG which is assigned to the brake pedal in the vehicle in order to determine the present brake pedal position. The pedal travel transducer signals PWG_SIG of the pedal travel sensor PWG are also fed to the microcontroller 30.

The voltage supplied to the pedal travel sensor PWG is realized by means of a first voltage supply unit 36 in the system ASIC 31 and by means of a second voltage supply unit 37 in the brake motor ASIC 32. This embodiment has the advantage that, in the event of a failure of the system ASIC 31, the voltage supplied to the pedal travel sensor PWG is ensured by means of the voltage supply unit 37 in the brake motor ASIC 32.

In the case of full functionality of all components of the control unit 11, the pedal travel transducer signals PWG_SIG can be processed in the microcontroller 30, whereupon, for example, an actuator in the hydraulic vehicle brake can be actuated in a manner dependent on the pedal travel in order to set a corresponding hydraulic brake pressure. In the event of a failure of the actuator in the hydraulic vehicle brake, the function of said actuator can be partially or entirely performed by the electromechanical brake device by means of the electric brake motors 13. For this purpose, in the logic unit 33 of the brake motor ASIC 32, the pedal travel transducer signals PWG_SIG are processed and, on the basis of the pedal travel transducer signals, the electric brake motors 13 are actuated by means of the brake motor ASIC 32 in a manner dependent on the present position of the brake pedal. This may also be performed in the event that the microcontroller 30, the system ASIC 31 or one of the communication interfaces SPI_1 or SPI_2 fails; even in this situation, actuation of the electric motors 13 is possible by means of the brake motor ASIC 32.

What is claimed is:

1. A brake system control unit for a vehicle having a hydraulic vehicle brake and an electromechanical brake device including at least one electric brake motor, the control unit comprising:
    a microcontroller configured to actuate at least one active brake component of the vehicle, the at least one active brake component being configured to manipulate a hydraulic pressure in the hydraulic vehicle brake;
    a system ASIC configured to acquire sensor signals in the vehicle;
    a brake motor ASIC configured to actuate the at least one an electric brake motor and to acquire pedal travel transducer signals of a brake pedal of the vehicle; and
    a plurality of communication interfaces configured to connect the microcontroller to the system ASIC and to the brake motor ASIC,
    wherein the brake motor ASIC is configured to actuate the at least one electric brake motor to generate a brake force depending on the pedal travel transducer signals, in response to a failure of one of the microcontroller, the system ASIC, and the plurality of communication interfaces.

2. The brake system control unit according to claim 1, wherein:
    at least the brake motor ASIC is configured to supply voltage to a pedal travel sensor of the vehicle,
    the pedal travel sensor configured to generate the pedal travel transducer signals.

3. The brake system control unit according to claim 2, wherein the brake motor ASIC and the system ASIC are configured to supply the voltage to the pedal travel sensor.

4. The brake system control unit according to claim 1, wherein the system ASIC is configured to acquire wheel rotational speed signals.

5. The brake system control unit according to claim 1, wherein the system ASIC is configured to acquire motor rotational position signals of the electric brake motor.

6. The brake system control unit according to claim 1, wherein the brake motor ASIC is configured to acquire wheel rotational speed signals.

7. The brake system control unit according to claim 1, further comprising:
    a logic unit configured to acquire a switching state of an actuation switch of the electromechanical brake device, the logic unit integrated into the brake motor ASIC.

8. A method for operating a brake system control unit of a vehicle including a hydraulic vehicle brake and an electromechanical brake device including at least one electric brake motor, the control unit including a system ASIC, a brake motor ASIC, and a microcontroller connected by a plurality of communication interfaces, the method comprising:
    generating control signals for actuation of at least one active brake component of the vehicle with the microcontroller of the control unit, during normal operation, with functional components of the control unit, the at least one active brake component being configured to manipulate a hydraulic pressure in the hydraulic vehicle brake; and actuating the at least one electric brake motor with a brake motor ASIC of the control unit to generate a brake force depending on pedal travel transducer signals of a brake pedal of the vehicle, in response to a failure of one of the microcontroller, the system ASIC, and the plurality of communication interfaces, wherein the system ASIC is configured to acquire sensor signals in the vehicle, and wherein the brake motor ASIC is further configured to acquire the pedal travel transducer signals of a brake pedal of the vehicle.

9. A brake system in a vehicle, comprising:

a hydraulic vehicle brake;

at least one active brake component, the at least one active brake component being configured to manipulate a hydraulic pressure in the hydraulic vehicle brake;

an electromechanical brake device including at least one electric brake motor; and a control unit, the control unit having:
  a microcontroller configured to actuate the at least one active brake component;
  a system ASIC configured to acquire sensor signals in the vehicle;
  a brake motor ASIC configured to actuate the at least one electric brake motor and to acquire pedal travel transducer signals of a brake pedal of the vehicle, and
  a plurality of communication interfaces configured to connect the microcontroller to the system ASIC and the brake motor ASIC,
  wherein the brake motor ASIC is configured to actuate the at least one electric brake motor to generate a brake force depending on the pedal travel transducer signals, in response to a failure of one of the microcontroller, the system ASIC, and the plurality of communication interfaces.

10. The brake system according to claim 9, wherein the at least one active brake component is an electrically controllable actuator for manipulation of the hydraulic pressure.

11. The brake system according to claim 10, wherein the electrically controllable actuator is an electric motor.

12. The brake system according to claim 9, further comprising:

a plurality of wheel brake devices located on a rear axle of the vehicle each equipped with an electric brake motor of the at least one electric brake motor.

* * * * *